No. 765,136. PATENTED JULY 12, 1904.
C. G. GOORD.
OVERHEAD CONDUCTOR POINT OPERATING MECHANISM.
APPLICATION FILED SEPT. 17, 1903.
NO MODEL. 2 SHEETS—SHEET 1.
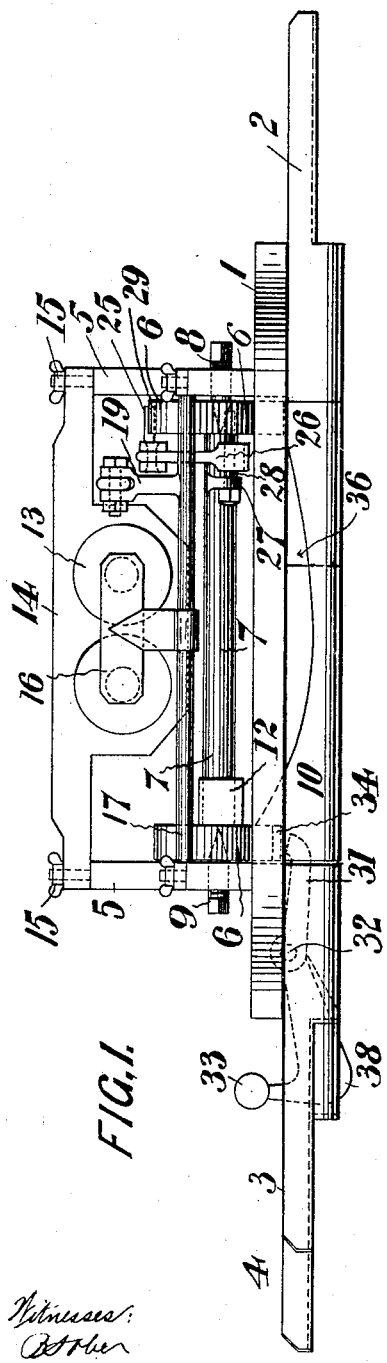
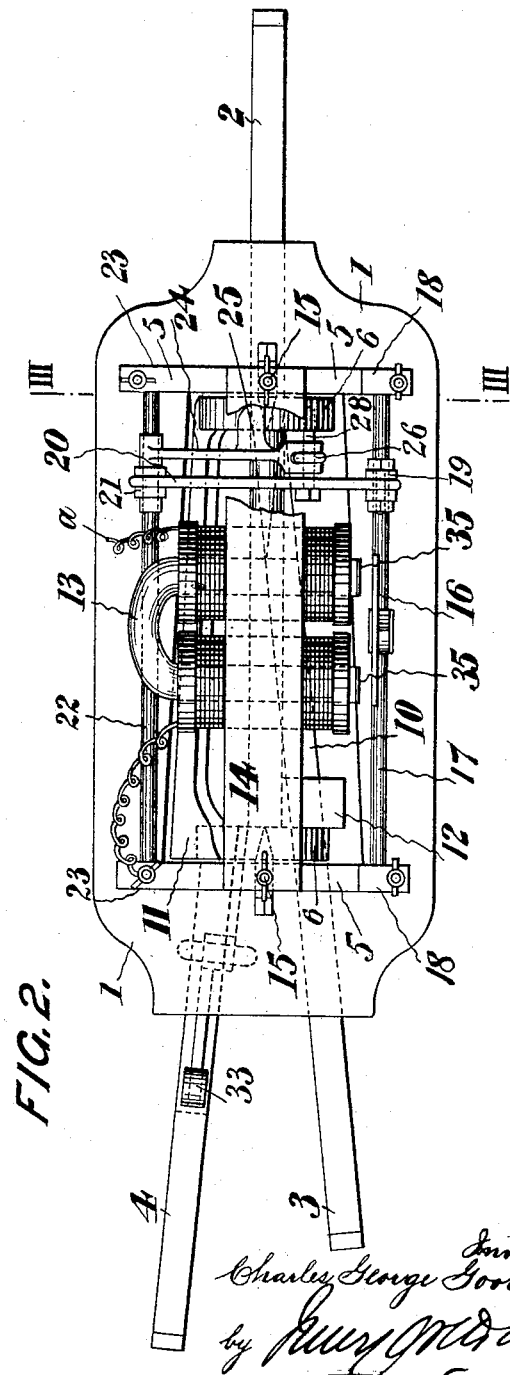

No. 765,136. PATENTED JULY 12, 1904.
C. G. GOORD.
OVERHEAD CONDUCTOR POINT OPERATING MECHANISM.
APPLICATION FILED SEPT. 17, 1903.
NO MODEL. 2 SHEETS—SHEET 2.
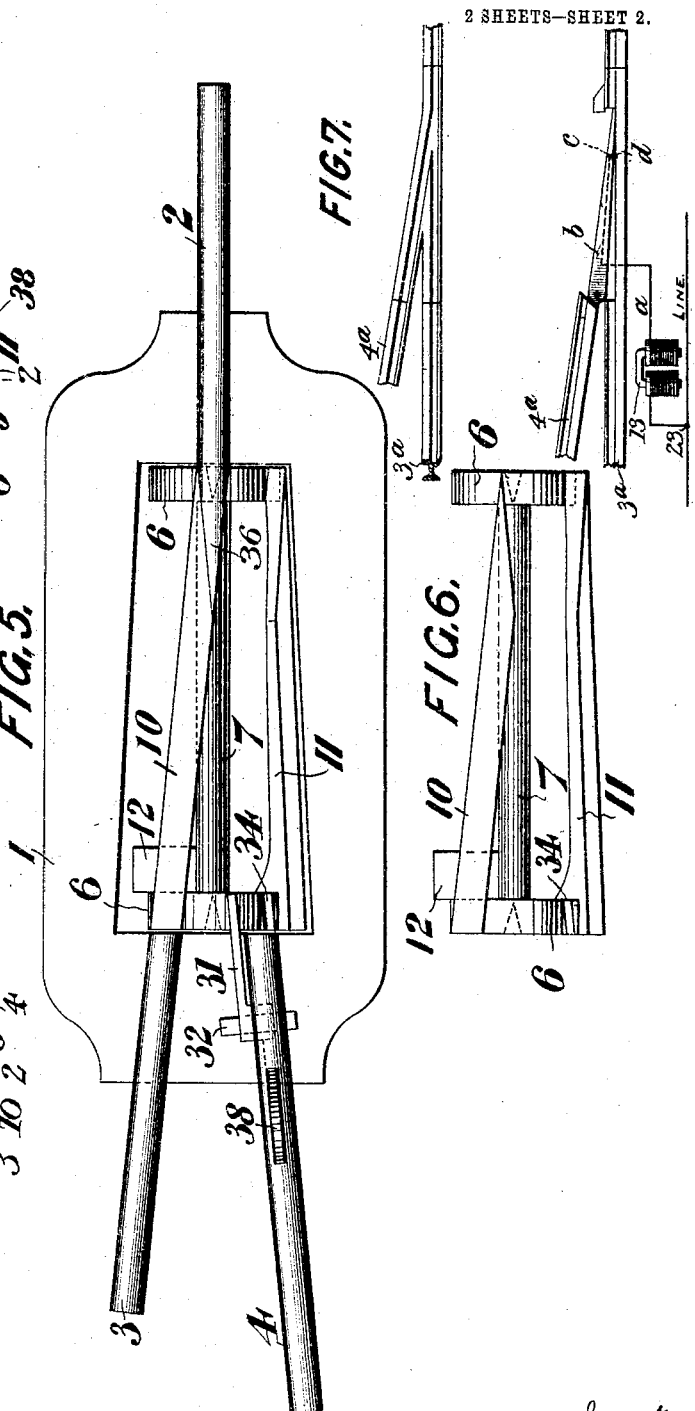

No. 765,136.

Patented July 12, 1904.

UNITED STATES PATENT OFFICE.

CHARLES GEORGE GOORD, OF BRIGHTON, ENGLAND.

OVERHEAD-CONDUCTOR-POINT-OPERATING MECHANISM.

SPECIFICATION forming part of Letters Patent No. 765,136, dated July 12, 1904.

Original application filed May 8, 1903, Serial No. 156,283. Divided and this application filed September 17, 1903. Serial No. 173,607. (No model.)

*To all whom it may concern:*

Be it known that I, CHARLES GEORGE GOORD, a subject of the King of Great Britain, residing at 89 Chester road, Preston Drove, Brighton, in the county of Sussex, England, have invented a new and useful Improved Overhead-Conductor-Point-Operating Mechanism, of which the following is a specification.

This invention relates to overhead-conductor-point-operating mechanism for railways and tramways particularly applicable for use in connection with rail-point-operating mechanism which enables the motorman or driver of a car or the like on approaching a junction to take the track to the left or the track to the right at will, said connections or points of the overhead conductor being operated automatically and simultaneously with the slip rail or tongue.

The terms "left" and "right" used in this specification mean to the left or right hand of the motorman or driver of a car approaching a junction.

The principle on which this invention is based is as follows: When the points are "set," the slip-rail is in position so that the track is open to the left. The points of the overhead conductor are also in position for the trolley-wheel to take the left cable. Thus a motorman having to take the left track can do so without paying attention to the point-working apparatus. When the right track is to be taken, the operation of the points, whether automatically from the car or otherwise, causes the simultaneous and corresponding operation of the overhead-conductor connections.

The accompanying drawings illustrate a convenient way of carrying out this invention, Figure 1 is an elevation of the left-hand side of the overhead-conductor points in the position connecting the conductors to the left. Fig. 2 is a plan of the overhead-conductor points in the position connecting the conductor to the left. Fig. 3 is a transverse section on the line 111 111, Fig. 2. Fig. 4 is a part end elevation and part section on the line 111 111, Fig. 2, showing the parts moved to the position for connecting the conductors to the right. Fig. 5 is an underneath view of the device. Fig. 6 is a similar view of the rotary member of the apparatus, and Fig. 7 is a diagram showing a switch-point to ground or otherwise complete circuit through the overhead-switch-operating magnet.

The overhead-conductor points are arranged upon a horizontal oblong frame 1, of gunmetal or other suitable non-magnetic material. Fixed to or made integral with the under side of this frame at one end is a metal strip 2, which may be of the same width as the diameter of the cable and concaved on the under side. At the opposite end of the frame are two similarly-formed strips 3 and 4. These three strips 2, 3, and 4 are hollowed along part of their length upon their under faces to receive the cables and form the terminals of the same. The cables may be screwed, riveted, or otherwise fixed to the said hollow or concave faces of the terminals. On the upper side and flush with the inner edge of the frame are two perpendicular supporting-plates 5 5. A metal cylinder or a metal bobbin consisting of two circular end disks 6, connected by a bar or spindle 7, is supported between the plates 5 5 by the adjustable pivots 8 and 9, screwing in the latter. On the under side of the cylinder or bobbin are two connecting-strips 10 and 11, either of which by a slight turn of the bobbin may be made to butt at one end against the pointed end 36 and at the other end to come opposite the strips 3 or 4, respectively. Thus the strip 10 can connect the single-cable connection 2 with the left-cable connection 3, as shown in Figs. 3 and 5, or the strip 11 can connect the right-cable connection 4 with the single-cable connection 2, as shown in Fig. 4, as required. Thus a trolley running along the piece 2 can be switched onto either the piece 3 or the piece 4, as desired.

Attached to one end of the spindle 7 of the bobbin is a weight 12, which holds in position the connecting-strip 10, that connects the cable 2 with the left cable 3. Above the cylinder or bobbin 6 7 is an electromagnet 13, held in position by a bar 14, of ebonite or other suitable substance, which is fixed to the tops of the supports 5 by means of screws and wing-nuts 15.

Opposite the poles of the magnet 13 is a keeper or armature 16, of soft iron, which is fixed to a spindle 17, capable of turning in bearings 18 in the plates 5.

To the spindle 17 an arm 19 is fixed, and said arm is connected by a rod 20 to the short arm 21 of a bell-crank lever fixed to a spindle 22, which turns in bearings 23 in the plates 5. The long arm 24 of the lever carries a catch or projection 25 and is connected, by means of a link 26, with one of the flanges 6 of the bobbin. This connection is seen on the right-hand side of Figs. 1 and 2, where an arm 27 is fixed to the spindle 7, and a pin 28 is passed through the end of said arm 27, the end of the link 26, and inserted into a hole in the right-hand disk 6.

The catch 25 drops into position behind a projection 29 on the right-hand disk when the cables are connected to the left, and thus locks the bobbin, thereby retaining the connecting-piece 10 securely in the position shown in Figs. 3 and 5. When the circuit of the magnet 13 is closed, say, by a switch operated by the moving of the rail-points—for instance, as described in my United States Patent No. 748,721—the electric current passes through the coils and the magnet 13 attracts the keeper 16, causing it to move the bell-crank lever 21 24 about its pivot, thus lifting the catch 25, and thereby unlocking the bobbin and at the same time, by means of the link-gear, turning the bobbin carrying the connecting-pieces 10 11 and lifting the weight 12, thereby connecting the single cable 2 with the right cable 4 by means of the connecting-piece 11, as shown in Fig. 4. When this connection is made, a catch 31 locks the cylinder or bobbin in this position. The said catch is pivoted at 32 and is overbalanced by a weighted arm 33, which causes it to enter a recess 34 in the left-hand one of the disks 6 of the bobbin when the said recess comes opposite the catch 31. When the rail-points are replaced, the said switch will open the circuit, and the magnet releases the keeper. The cylinder or bobbin, however, is held by the catch 31 and cannot turn back to its former position until the trolley-wheel has passed over the connection. When this has occurred, the trolley-wheel comes into contact with the projecting part 38 of the weighted arm 33 of the catch, thereby raising the weighted arm 33 and removing the catch 31 from the recess 34, and so releasing the bobbin 6 7 and allowing it to turn back, being actuated by the falling of the weight 12, so that the cables 2 and 3 are again connected by the piece 10 and locked to the left, as shown in Fig. 3.

When the piece 10 butts against the pointed end 36, its other end is opposite the terminal 3, as seen in Figs. 3 and 5. Thus a trolley will run from 2 onto the piece 10 and thence onto the terminal 3. The piece 11 is of course in the raised position. The current proceeds from 2 to 3 by way of the frame 1. When the piece 11 butts against the pointed end 36, its other end is opposite the terminal piece 4, as seen in Fig. 4. Thus a trolley will run from 2 onto the piece 11 and thence onto the terminal piece 4. In this position of the mechanism the piece 10 is raised, as shown in Fig. 4.

To insure an instantaneous release of the keeper when the rail-points are returned to the normal and the circuit is opened, it is advisable to arrange that the surface of the keeper never quite touches the poles of the magnet. This may be done by placing a thin sheet of brass 35 or other non-magnetic substance over the poles of the magnet.

One end of the winding of magnet 13 is electrically connected to line through binding-post 23, Figs. 1, 2, and 7; and the other end, $a$, of the winding is continued by a suitable conductor to a contact $c$, insulated from the rail switch-point $b$, so that when the rail switch-point $b$ is open to permit a car to pass on the left track $3^a$ no current will pass through the magnet, and the overhead switch, by reason of its weight 12, will be in normal position, connecting line-wires 2 and 3. On the other hand, when the rail switch-point is thrown to cause a car to pass to track $4^a$, as shown in Fig. 7, the contact $c$ presses against the track-rail $d$ to close circuit through the windings of the electromagnet 13 to the line of rails that forms the metallic return.

In lieu of a simple switch-operating mechanism shown herein the switch and operating mechanism described and shown in my patent above referred to are used.

What I claim as my invention, and desire to secure by Letters Patent, is—

1. Overhead-conductor-point-operating mechanism comprising a switch operated by the rail-point a magnet upon the overhead frog, an electric circuit including said magnet and said switch, and conductor connections operated by said magnet substantially as set forth.

2. Overhead-conductor-point-operating mechanism comprising a switch operated by the rail-point, a magnet upon the overhead frog, an electric circuit including said magnet and said switch, an armature for said magnet, a catch connected with said armature, a rotary bobbin, conductor connections upon said bobbin, a projection upon said bobbin for engaging said catch, and means for transmitting the movement of said armature to said bobbin for the purpose of shifting said connections substantially as set forth.

3. Overhead-conductor-point-operating mechanism comprising a switch operated by the rail-point, a magnet upon the overhead frog, an electric circuit including said magnet and said switch, an armature for said magnet, a bell-crank lever, a rod connecting one arm of said lever with said armature, a catch upon the other arm of said lever, a rotary bobbin, conductor connections upon said bobbin, a projection upon said bobbin for engaging said catch, a link connecting the second-named arm of said lever with said bobbin for moving the latter one way, and means for returning said bobbin to its original position substantially as set forth.

4. Overhead - conductor - point - operating mechanism comprising means operated by and simultaneously with the rail-point for correspondingly shifting the overhead-conductor connections, a catch for locking the said connections, means for returning said connections to the original position, means for operating the stop to relock said automatic means, and means for operating said catch to release said connections whereby they may be returned to the original position substantially as set forth.

5. Overhead - conductor - point - operating mechanism comprising a switch operated by the rail-points, a magnet upon the overhead frog, an electric circuit including said magnet and said switch, an armature for said magnet, a bell-crank lever, a rod connecting one arm of said lever with said armature, a catch upon the other arm of said lever, a rotary bobbin, conductor connections upon said bobbin, a projection upon said bobbin for engaging said catch, a link connecting the second-named arm of said lever with said bobbin for moving the latter one way, a counterweight for moving the bobbin the other way, a recess in said bobbin, a counterweighted catch adapted to enter said recess to retain said bobbin against the action of said counterweight, and a cam projection on said catch which is brought into the path of the trolley whereby said catch is operated to release said bobbin substantially as set forth.

6. Overhead - conductor - point - operating mechanism comprising means operated by and simultaneously with the operation of the rail-points for correspondingly shifting the overhead-frog connections, a catch for locking the said connections, means for returning said connections to the original position, and means for operating said catch to release said connections whereby they may be returned to the original position substantially as set forth.

7. In an overhead-conductor switch, a movable overhead-conductor switch-point, an electromagnetic device electrically connected to line to move said point and a rail-point to close electric circuit through the electromagnetic device, to operate the overhead - conductor switch-point, substantially as described.

8. In an overhead-conductor switch, a movable overhead-conductor switch-point, an electromagnetic device to move said point and having one terminal electrically connected to line, a rail switch-point to short-circuit part of the current from line through the electromagnetic device to the metallic return-circuit, substantially as described.

9. In an overhead-conductor switch, a plurality of overhead-conductor switch-points, an electromagnetic device to move them, one of said points normally connecting two conductors and means to close circuit through the electromagnetic device to position another of said points, to connect at the third conductor with one of the others, substantially as described.

10. In an overhead-conductor switch, two overhead-conductor switch-points mounted to rotate on a common center, means to normally lock one of said points to connect two conductors, an electromagnetic device to unlock the point and position and lock the second point to connect a third conductor with one of the aforesaid conductors, substantially as described.

In testimony whereof I have signed my name to this specification in the presence of two subscribing witnesses.

CHARLES GEORGE GOORD.

Witnesses:
 HUGH INMAN,
 N. BURGESS.